United States Patent
Gross et al.

(10) Patent No.: US 10,015,139 B2
(45) Date of Patent: Jul. 3, 2018

(54) INTER-ARRIVAL TIME INTRUSION-DETECTION TECHNIQUE TO PROVIDE ENHANCED CYBERSECURITY

(71) Applicant: Oracle International Corporation, Redwood Shores, CA (US)

(72) Inventors: Kenny C. Gross, Escondido, CA (US); Kalyanaraman Vaidyanathan, San Diego, CA (US); Andrew E. Brownsword, Bowen Island (CA)

(73) Assignee: Oracle International Corporation, Redwood Shores, CA (US)

( * ) Notice: Subject to any disclaimer, the term of this patent is extended or adjusted under 35 U.S.C. 154(b) by 190 days.

(21) Appl. No.: 15/015,055

(22) Filed: Feb. 3, 2016

(65) Prior Publication Data

US 2017/0222976 A1    Aug. 3, 2017

(51) Int. Cl.
*G06F 9/00* (2006.01)
*H04L 29/06* (2006.01)

(52) U.S. Cl.
CPC ...... *H04L 63/0254* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 6,629,266 | B1 * | 9/2003 | Harper | G06F 11/1438 714/38.1 |
| 7,542,995 | B2 | 6/2009 | Thampy et al. | |
| 7,814,542 | B1 * | 10/2010 | Day | H04L 63/1408 713/188 |
| 7,890,612 | B2 * | 2/2011 | Todd | G06F 21/577 709/220 |
| 2005/0132219 | A1 * | 6/2005 | Robert | H04L 45/00 726/4 |
| 2007/0239740 | A1 * | 10/2007 | Thampy | G06K 9/00536 |
| 2008/0162390 | A1 * | 7/2008 | Kapoor | G06F 9/505 706/20 |
| 2009/0240644 | A1 * | 9/2009 | Boettcher | H04L 41/142 706/47 |
| 2009/0262657 | A1 * | 10/2009 | Ekelin | H04L 41/0896 370/252 |
| 2011/0219035 | A1 * | 9/2011 | Korsunsky | G06F 17/30 707/784 |

(Continued)

*Primary Examiner* — Farid Homayounmehr
*Assistant Examiner* — Olanrewaju J. Bucknor
(74) *Attorney, Agent, or Firm* — Park, Vaughan, Fleming & Dowler LLP

(57) ABSTRACT

The disclosed embodiments relate to a system that performs an intrusion-detection technique to differentiate between packets received from malicious remote users and legitimate local users in a networked computer system. During operation, the system determines arrival times for incoming packets at a node in the networked computer system. Next, the system determines inter-arrival times between the incoming packets from the arrival times. The system then determines a mean cumulative function (MCF) for the inter-arrival times by computing a cumulative sum of the inter-arrival times. Finally, upon detecting a change in a slope of the MCF, the system generates an alarm to indicate that a malicious remote user may be generating some of the incoming packets.

20 Claims, 3 Drawing Sheets

(56) References Cited

U.S. PATENT DOCUMENTS

| | | | |
|---|---|---|---|
| 2012/0044819 A1* | 2/2012 | Lin | H04L 45/125 370/252 |
| 2013/0139263 A1* | 5/2013 | Beyah | H04L 63/1408 726/23 |
| 2014/0181978 A1* | 6/2014 | Bu | H04L 63/1425 726/24 |
| 2015/0047032 A1* | 2/2015 | Hannis | H04L 63/1416 726/23 |
| 2016/0020923 A1* | 1/2016 | McLeod | H04L 43/022 370/392 |

* cited by examiner

INTER-ARRIVAL TIME INTRUSION-DETECTION TECHNIQUE TO PROVIDE ENHANCED CYBERSECURITY

BACKGROUND

Field

The disclosed embodiments generally relate to techniques for providing computer security in networked computer systems. More specifically, the disclosed embodiments relate to the design of a system that performs an inter-arrival time (IAT) fingerprint intrusion-detection technique to provide enhanced cybersecurity.

Related Art

Massive data breaches involving millions of credit card numbers stolen from networked computer systems have received a lot of publicity lately. These data breaches by malicious intruders have caused the targeted corporations to suffer large-scale financial losses and also long-term damage to their customer relationships. Such financial losses and loss of goodwill are troubling. However, malicious intruders can potentially inflict significantly greater harm by targeting supervisory control and data acquisition (SCADA) networks that connect enterprise servers, which are commonly used by the United States government and other organizations as "front end networks" for controlling energy production facilities, power grids, water treatment plants, nuclear power plants, and most of the chemical processing plants in the world.

Both SCADA networks and enterprise-computing networks typically use Ethernet frames to forward packets among multiple nodes of the network until they reach their final destination. To achieve this, Ethernet frame headers contain the source and destination media access control (MAC) addresses.

One particularly challenging instance of malicious intrusion happens when an attacker is able to spoof in software the IP and MAC addresses, as well as the login credentials (e.g., through "phishing") for authenticated users, to bypass firewalls and other security measures, to gain access to critical assets and information. For business-critical and mission-critical networks where the only authenticated users are inside the firewall (or otherwise inside the same facility as the critical computing assets), it is not possible for conventional security measures to distinguish between authentic, benign local users and malicious remote users who have spoofed IP and MAC addresses and login credentials for legitimate local users.

Hence, what is needed is an intrusion-detection system that can differentiate between malicious remote users and legitimate local users.

SUMMARY

The disclosed embodiments relate to a system that performs an intrusion-detection technique to differentiate between packets received from malicious remote users and legitimate local users in a networked computer system. During operation, the system determines arrival times for incoming packets at a node in the networked computer system. Next, the system determines inter-arrival times (IATs) between the incoming packets from the arrival times. The system then determines a mean cumulative function (MCF) for the IATs by computing a cumulative sum of the inter-arrival times. Finally, upon detecting a change in a slope of the MCF, the system generates an alarm to indicate that a malicious remote user may be generating some of the incoming packets.

In some embodiments, while detecting the change in the slope, the system uses the Sen's nonparametric slope estimation technique to compute the slope of the MCF.

In some embodiments, while detecting the change in the slope, the system uses the Mann-Kendall test to detect a change point in the slope of the MCF.

In some embodiments, while detecting the change in the slope, the system uses a fast Mann-Kendall computation to detect a change point in the slope of the MCF, wherein the fast Mann-Kendall computation inserts data points into a balanced search tree to improve performance of the Mann-Kendall computation.

In some embodiments, prior to determining the IATs, the system filters the incoming packets based upon at least one filtering criterion to generate a set of filtered incoming packets to be used in determining the inter-arrival times.

In some embodiments, upon detecting the change in the slope, the system estimates a number of network hops traversed by packets originating from the malicious remote user based on a magnitude of the change in slope.

In some embodiments, while determining the arrival times for the incoming packets, the system obtains the arrival times for the incoming packets from timestamps generated by a packet-capturing tool located at the node in the networked computer system.

In some embodiments, generating the alarm includes sending the alarm to a system administrator to enable the system administrator to verify whether a malicious remote user has compromised the network computer system by using a spoofed credential.

DETAILED DESCRIPTION

Figure 1:
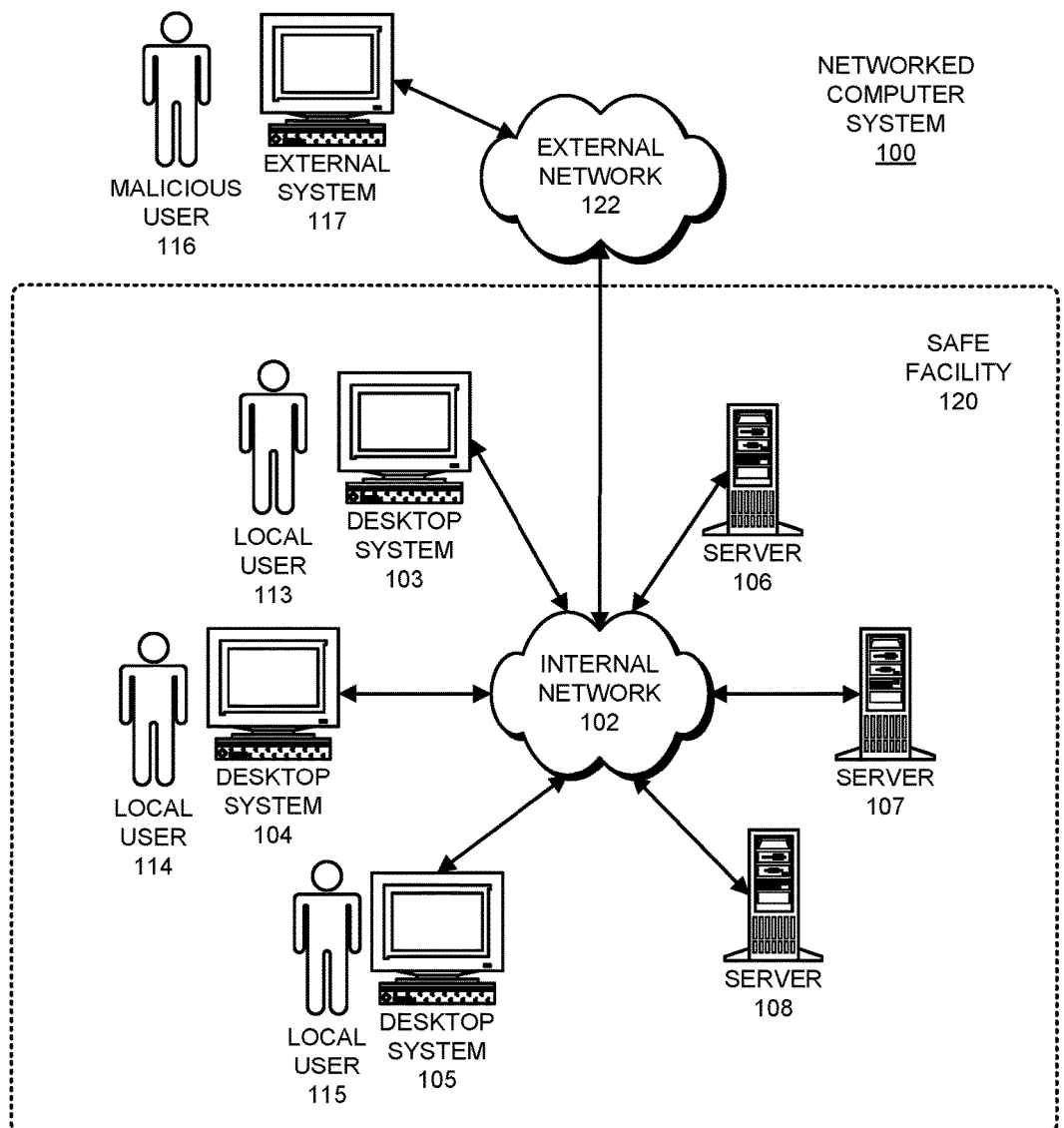
FIG. 1 illustrates a networked computer system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, one common mode for malicious intrusion into business-critical networks and cloud systems is through spoofing MAC and IP addresses and login credentials (e.g., obtained by phishing) of authenticated users, then bypassing firewall and other security measures to gain access to critical assets and information.

The embodiments disclosed herein teach a novel "IAT fingerprint" analytical technique that can passively distinguish local authenticated users from remote malicious users, even when the malicious users have exactly the same MAC and IP addresses and exactly the same login credentials as local authenticated users. Moreover, the IAT fingerprint technique taught herein provides a number of advantages for cybersecurity applications: (1) ultra-low (and configurable) false-alarm and missed-alarm probabilities; and (2) extremely high (and configurable) confidence factors for rapid alerting and termination of malicious intrusion events, well before most modes of hacking damage can be completed.

The disclosed embodiments use a unique combination of techniques to monitor and analyze the IATs for packets arriving from authentic users to the critical assets in the network. Note that these IATs are not the transit times from a user device to a target device. Instead, the IATs are the very tiny differences in the arrival times for those packets at the target device.

It has been empirically determined that the distribution of IATs for communications among local devices inside the same facility is a stationary stochastic distribution (stationary in the statistical sense: noisy observations about a stationary mean that is a characteristic of the network IP protocol). However, if exactly the same communication between an authenticated user and a target asset comes from a user device that is geographically distant, that communication has to traverse multiple network "hops." Consequently, the distribution of IATs is significantly different, because at each "hop," there is packet queuing and burst releases from repeaters. Moreover, when communications traverse multiple hops, there are more "dropped packets" at the receiving destination. Although TCP/IP can handle dropped packets by simply re-transmitting the dropped packets, this re-transmission introduces additional delays in packet IATs at the receiving node, further distorting the histogram of IAT values as compared to that of local authentic users.

While it is possible for a human security expert looking at the empirical histogram of IAT values to visually discern the difference between an authentic local user and a malicious remote user who has spoofed the IP and MAC addresses and the authentication credentials for the local user, it is impractical to have human security personnel subjectively watching IAT histograms for multiple authenticated users on a 24/7 basis.

Hence, the disclosed embodiments provide an automated pattern-recognition technique that meets the following quantitative deterministic performance criteria (which are important for cybersecurity applications): (1) extremely low and configurable false-alarm and missed-alarm probabilities (FAPs and MAPs); (2) extremely high (and quantifiable) confidence factors for generating Indicator-of-Compromise (IOC) alarms upon detection of a malicious intrusion event; and (3) the technique is extremely fast-acting so that malicious intrusion events can be terminated before attackers can do damage.

The techniques employed by the disclosed embodiments solve this long-standing cyber security challenge and meet all three of the foregoing functional requirements. Additionally, the disclosed technique has a very low compute cost, so it can be run in real-time on a low-cost 1U network box.

Previous attempts to exploit packet arrival times for categorizing and distinguishing local from remote users have met with poor success because they are based upon thresholding, i.e. researchers attempt to measure and monitor empirical arrival time series and separate local from remote users who are one, two, or N Internet hops away by computing an optimum threshold using sophisticated pattern-classification, machine learning (ML), or deep learning (DL) techniques. This approach is fundamentally flawed for cybersecurity applications because it is not possible to independently specify, a priori, the false-alarm and missed-alarm probabilities (FAPs and MAPs). No matter how intelligently one computes the optimal thresholds, an endemic problem with thresholding approaches is a "see-saw effect" between FAPs and MAPs. If a threshold is drawn too close to a noisy process distribution, then it is increasingly likely that spurious observations on the tail of the distribution will trigger frequent false alarms. But if the thresholds are moved further away to lower the FAP, then the MAP goes up, meaning that subtle intrusion events go undetected.

The techniques employed by the disclosed embodiments address a specific challenge for cybersecurity applications, where the mode of malicious intrusion occurs when an attacker is able to spoof in software the IP and MAC addresses, as well as the login credentials (e.g., through phishing) of authenticated users, and then bypass firewalls and other security measures, to gain access to critical assets and information.

Details

For this specific security vulnerability, and for business-critical enterprise and cloud networks, and safety-critical SCADA networks, wherein the authenticated users are either inside the firewall (or at least in the same facility), the new techniques embodied in the disclosed embodiments are able to rapidly detect a malicious intrusion event even though the attacker may have identical IP and MAC addresses, as well as identical login credentials, as an authenticated local user.

An important difference between prior art techniques and the new techniques associated with the disclosed embodiments is that the new techniques meet the following advantageous criteria: (1) extremely low and configurable false-alarm and missed-alarm probabilities (FAPs and MAPs); (2) extremely high (and quantifiable) confidence factors for generating Indicator-of-Compromise (IOC) alarms upon detection of a malicious intrusion event; and (3) the new techniques are extremely fast-acting so that malicious intrusion events can be terminated before attackers can do damage.

One embodiment of this technique works in critical networks that typically do not allow remote users. For such facilities, where the authenticated users are inside the firewall (or inside the facility housing the critical asset nodes), it is typical for the facility to have two or more networks that can support interactions that range from open Internet access, to inter-company WAN communications, to extremely confidential interactions. For facilities that allow remote access/interactions for one or more non-critical LANs/WANs inside the facility, the instant invention can bring added return on investment with enhancement of security objectives.

Many interested users in the research community are able to extract network packet inter-arrival times from network communications. We are aware of discussions in security meetings concerning trying to leverage the fact that packet IAT distributions must be different for remote users as compared with local users. However, a number of techniques that seek to leverage this "feature" of IAT distributions have been attempted and abandoned because conventional statistical characterization techniques, or threshold-based tests (either with conventional thresholds, or with "intelligent" hyperplane thresholding, e.g. from Support Vector Machines), yield FAPs that are too high, or MAPs that are too high, or both.

The disclosed embodiments use a unique combination of techniques that work with any network protocol and allow the FAP and MAP to be independently configurable and to both be extremely small (which is essential for cybersecurity applications), as well as allowing the overall IAT fingerprint technique to have a very small compute-cost overhead, which is advantageous for real-time security surveillance applications in high-speed modern networks.

Before describing these new techniques in more detail, we first describe the system in which the new techniques operate.

Networked Computer System

FIG. 1 illustrates an exemplary networked computer system 100 in accordance with the disclosed embodiments. Networked computer system 100 includes a safe facility 120, such as a networked computer system inside of an organization, which comprises an internal network 102 that connects a set of desktop systems 103-105 (operated by associated local users 113-115) with a set of servers 106-108 that host applications and services that are accessed by local users 113-115 through desktop systems 103-105.

Networked computer system 100 also includes an external system 117 operated by a malicious user 116 who attempts to gain access to computer systems within safe facility 120 via communications that traverse an external network 122 before entering internal network 102.

Note that the intrusion-detection technique described in this disclosure operates by differentiating between the longer IATs for packets originating from external network 122 and the shorter IATs for packets originating from internal network 102. Hence, the only requirement to perform such differentiation is that the IATs for packets originating from external network 112 must be longer (e.g., involve more network hops) than the IATs for packets originating from internal network 102.

Intrusion-Detection Process

Figure 2:
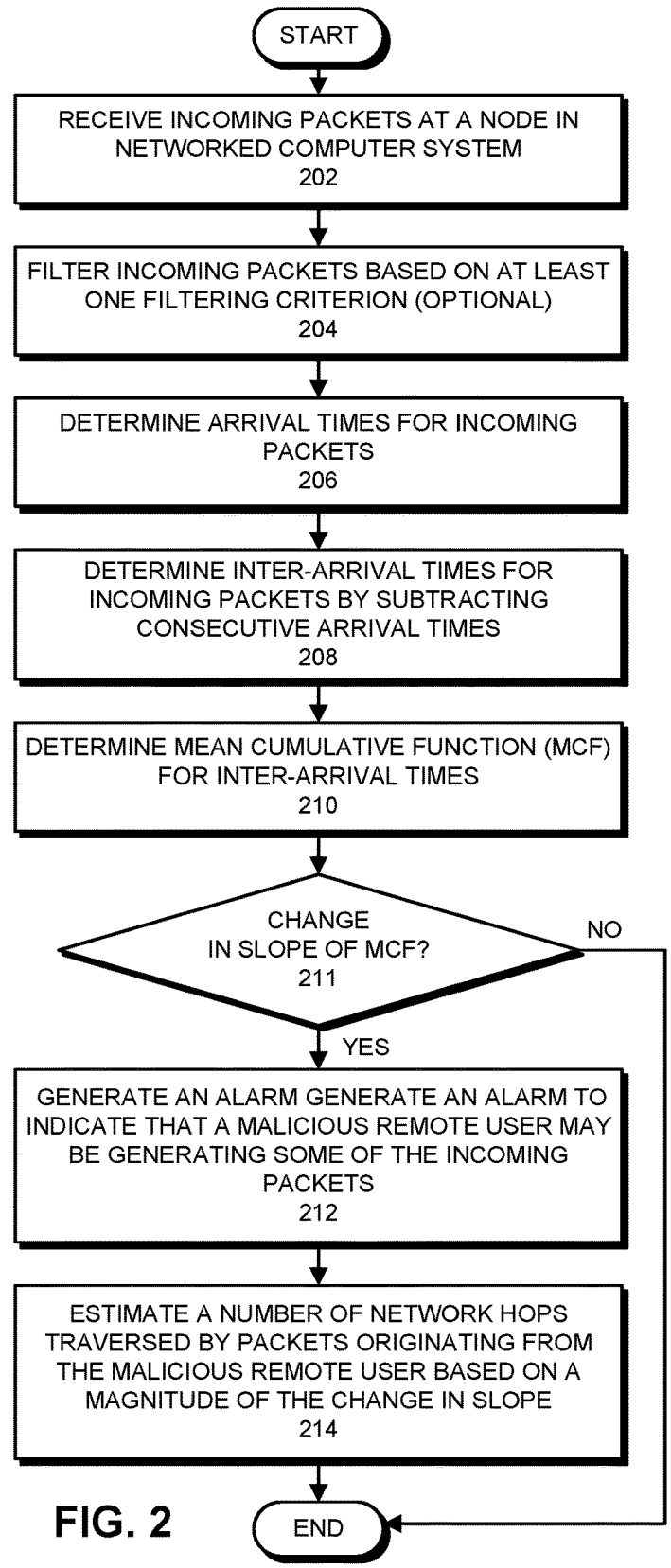
FIG. 2 presents a flow chart illustrating how the intrusion-detection technique operates in accordance with the disclosed embodiments.

FIG. 2 presents a flow chart illustrating how the new intrusion-detection technique operates in accordance with the disclosed embodiments. During operation, the system receives incoming packets at a node in a computer system (for example, at server 106 in FIG. 1) (step 202). Next, the system optionally performs a filtering operation on the packets (step 204), which for example can involve filtering out packets that do not adhere to a specified protocol, such as TCP or UDP, or filtering out packets that are not directed to specific IP addresses. Next, the system determines arrival times for incoming packets at a node in the networked computer system (step 206). For example, in one embodiment, the packets are gathered using a packet-capturing tool, such as the Wireshark™ packet analyzer distributed by the Riverbed Technology, Inc., of San Francisco, Calif., and the arrival times are determined from timestamps provided by the packet-capturing tool. Next, the system determines inter-arrival times between the incoming packets by subtracting consecutive arrival times (step 208). The system then determines a mean cumulative function (MCF) for the inter-arrival times by computing a cumulative sum of the inter-arrival times (step 210).

Next the system determines whether there is a change in the slope of the MCF (step 211). If not, the process is complete. On the other hand, if there is a change in the slope of the MCF, the system generates an alarm to indicate that a malicious remote user may be generating some of the incoming packets (step 212). This alarm can be sent to a system administrator to enable the system administrator to verify whether a malicious remote user has compromised the network computer system by using a spoofed credential. The system can also optionally estimate a number of network hops traversed by packets originating from the malicious remote user based on a magnitude of the change in slope. (Note that a larger change in slope indicates that more network hops are involved.)

EXAMPLE

Figure 3:
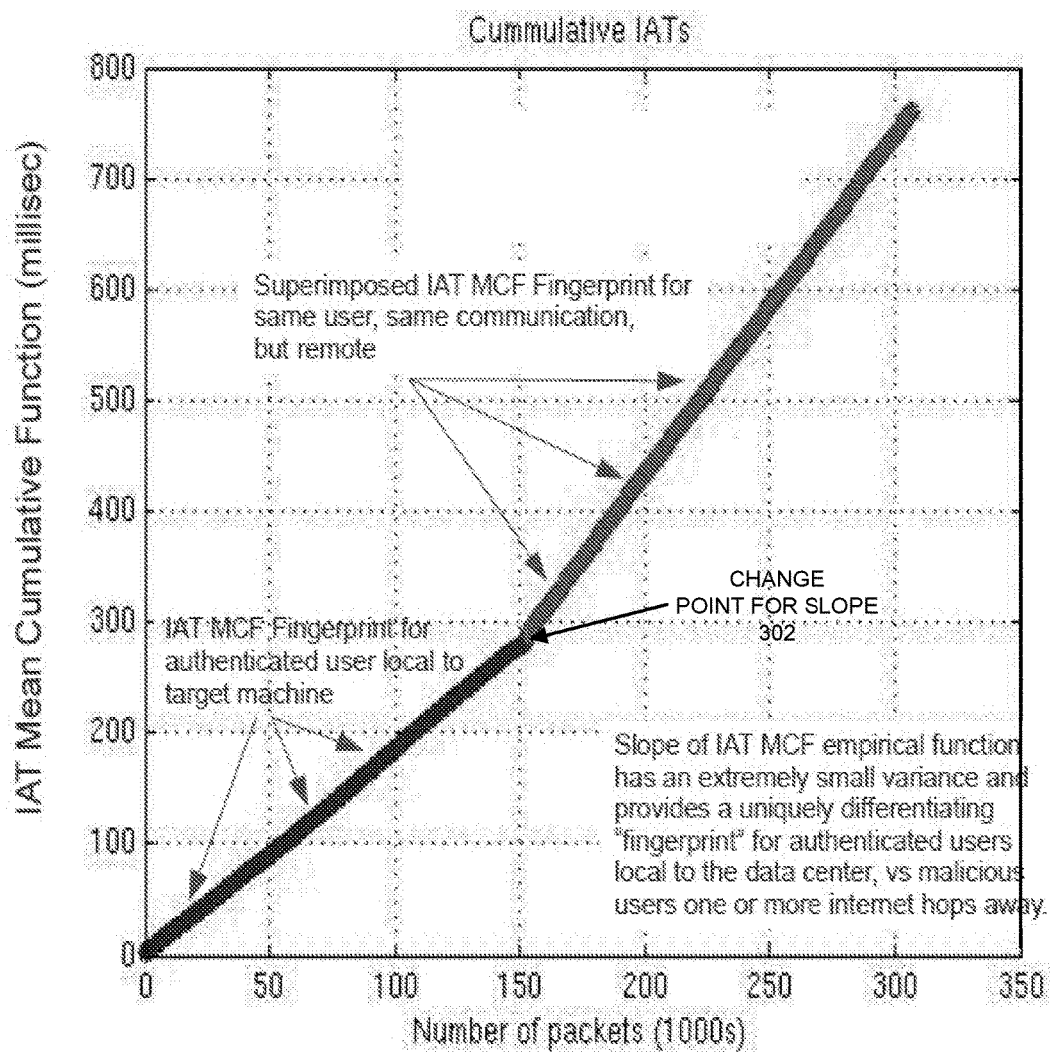
FIG. 3 presents a graph illustrating an exemplary MCF with a change in slope in accordance with the disclosed embodiments.

For example, FIG. 3 presents a graph illustrating an exemplary MCF with a change point 302 for the slope in accordance with the disclosed embodiments. On the left side of this graph (before change point 302), the slope of the MCF is consistent with an IAT MCF fingerprint for an authenticated user local to a target machine. In contrast, on the right side of this graph (after change point 302) the slope is greater because it reflects the IAT MCF fingerprint for the authenticated local user superimposed over communications from a malicious remote user who is one hop away.

Techniques For Detecting a Change in Slope

A number of different techniques can be used individually or in combination to detect a change in slope. For example, possible techniques for detecting a change in slope include: (1) an Inter-arrival Time (IAT) Mean Cumulative Function (MCF) Construction Technique; (2) Sen's Nonparametric Slope Estimation Technique; (3) the Mann-Kendall Change-Point Detection Technique; and (4) a Fast Variation of the Mann-Kendall Technique that uses a balanced binary search tree.

IAT MCF Construction Technique

The disclosed embodiments monitor and analyze "inter-arrival times" (IATs) for packets arriving from authentic users to the critical assets in the network. Note that these IATs are not the elapsed transit times from a user device to a target device. Instead, the IATs are the very tiny differences in the arrival times for those packets at the target device. For cases where all legitimately authenticated users are in the same facility as the critical network node devices, the distribution of IATs constitutes a stochastic stationary process, with noisy values distributed about a uniform mean. It is known that the cumulative sum of IATs from stationary stochastic processes lies along a straight line with a constant slope. The IAT MCF Construction Technique operates by continually computing a present slope for the IAT MCF based on IATs for packets contained in a trailing time window, and then generating an alarm when the present slope changes.

Sen's Nonparametric Slope Estimation Technique

We now discuss the Sen's nonparametric slope estimation technique. If a linear trend is present in a set of time series data, the true slope or the change (increase/decrease) per unit time can theoretically be estimated using conventional least squares estimations of the slope obtained through linear regression methods. However, these approaches are unsuitable for our cybersecurity application because if gross errors or outliers are present in the IAT time series streams, the estimated slope can deviate greatly from the true slope of the data (i.e., the conventional least squares approaches lack robustness). Furthermore, linear regression does not handle missing data.

Sen developed a trend-estimation procedure which is extremely robust regarding spurious outliers and can be used even when data points are missing (see Sen, P. K., Estimates of the regression coefficient based on Kendall's Tau, J. Am. Stat. Assoc., 63, 1379-1389, 1968). This technique, being nonparametric, makes no assumptions on the distribution of data and does not rely on the estimation of parameters describing the distribution. This characteristic of Sen's technique is advantageous for our cybersecurity application, because it enables our technique to be agnostic to the IP Protocol in place for the network. For any IP Protocol, the distribution of IAT observations for any given authenticated user and any target asset node in the network will be a stationary stochastic process ("stationary" in the statistical sense that there is a noisy process distribution about a mean that is stationary over time). The fact that Sen's technique is nonparametric means that our cybersecurity innovation can be applied to any presently known network architecture with any IP Protocol.

Sen's technique for slope estimation can be implemented as follows. Compute N' slope estimates given by $Q=(X_b-X_a)/(b-a)$, where $X_a$ is the data point at time a, $X_b$ is the data point at time b, and b>a; and where N' is the number of data points such that b>a.

If there is only one datum per each time spacing, N'=n(n−1)/2, where n is the total number of observations. If there are multiple observations per time spacing, then N'<n(n−1)/2. In this case, there are two options to compute the estimated slope. The first option is to combine the measurements for a given time spacing into a single measure of central tendency (such as mean or median) and then proceed as above. The second option is to calculate the slope for every individual measurement. The slope between measurements collected at the same time is not calculated.

The median of these N' values of slope, Q is the Sen's estimator of slope. That is, the N' values of Q are ranked from smallest to largest, denoted by $Q1<=Q2<=Q3<=\ldots<=Q[N'-1]<=QN'$.

Hence, Sen's estimator =median slope =Q'
=$Q[(N'+1)/2]$, if N' is odd, and
=$\frac{1}{2}*\{Q[N'/2]+Q[(N'+2/2]\}$, if N' is even.

Note that Sen's technique also allows determination of whether the median slope is statistically different from zero. A confidence interval is derived by computing the rank of the upper and lower confidence intervals and using the slopes corresponding to these ranks to define the actual confidence interval for Q'.

In the case of missing data, the slope for the missing data point is not computed, but the missing data points are counted toward the total number of observations, n.

For any given authenticated user at the location of the network, the slope of the IAT function will be a fixed constant (although the IAT values have a distribution with some variance V, the MCF curve has a characteristic slope that is empirically three orders of magnitude smaller than V (for large data sets) as obtained from moving-window surveillance of network packet inter-arrival times), giving our innovation the ability to distinguish a local authenticated user from a remote user with "spoofed" authentication—even in the most challenging case where the remote user is only one hop away. (Note that the further away the hacker is, the larger the slope of the IAT MCF functions.)

Note that IAT functions for all authenticated users are "normalized" by subtracting the highly-accurate Sen's slope from the empirical IAT curve, yielding a stochastic time series centered about zero. (Again, it is important to point out that the histogram distribution for the time series does not matter because this technique is nonparametric.)

Mann-Kendall Change-Point Detection Technique

Under the Mann-Kendall Change-Point Detection Technique, we monitor authenticated users' normalized IAT functions with an extremely sensitive change-point detection procedure called the Mann-Kendall (MK) test. (See Mann, H. B. 1945. *Non parametric tests against trend*, Econometrica 13:163-171, and also see Kendall, M. G. 1975. *Rank Correlation Methods*, 4$^{th}$ edition, Charles Griffin, London.) The MK test has the advantage that it has a quantitative confidence factor for making a decision that there has been a change in the slope of the distribution with the shortest mathematically possible decision time (crucial for our cybersecurity application), and with ultra-low Type-I and Type-II error probabilities (which for our cybersecurity application are the false-alarm and missed-alarm probabilities, FAPs and MAPs).

Although the new technique reported here works for continuous real-time surveillance of the IAT MCF fingerprints for all authenticated users in the network, it is possible but extremely unlikely that a given user's IAT MCF fingerprint will change in a microsecond (i.e., it is extremely unlikely that a malicious user can instantly take over an already open authenticated session). Rather, a major anticipated benefit from the new innovation reported here is an embodiment where "piecewise continuous" digitized IAT MCF time series are monitored for all authenticated users. In other words, authenticated users can log in and log out any number of times and for any durations, and the novel pattern-recognition technique reported herein is actually monitoring the piecewise continuous IAT MCF fingerprints for such users.

Also, the unique combination of statistical-mathematics techniques that are employed are totally agnostic to the beginning and the ending of piecewise time series segments (this would not be the case for many conventional "fixed interval" statistical tests that require a fixed minimum number of samples before a decision can be made with a desired confidence factor). Whenever an authenticated user in the facility containing the critical network assets logs off (or otherwise terminates a session), if the next login for that user, whether a year later or a microsecond later, is a remote user with identical credentials, the new pattern-recognition technique reported here will detect the activity and actuate an Indicator-of-Compromise (IOC) alarm rapidly and with a high confidence factor.

Fast Variation of the Mann-Kendall Technique

The well-known conventional MK test, developed decades ago before the advent of computers, was originally used for small populations of observations, e.g. manually tracking the reliability of manufactured devices under test and determining if the failure rate increases or decreases. For cybersecurity telemetry applications, our observations are not physical devices being tested for pass/failure; instead, they are sequences of digitized observations coming from a network telemetry stream. One problem with the MK test that has heretofore made it unsuitable for long time series of digitized processes is its computational cost, which is not only high, but grows quadratically with the number of observations. This imposes an enormous compute-cost overhead for cybersecurity applications.

In one embodiment, we use an AVL tree (Adelson-Velskii and Landis) data structure to store data points. An AVL tree is a balanced binary search tree where the height of the two sub-trees of a node differs by at most one. Computational complexity of look-up, insertion, and deletion are log(N). This implementation drastically reduces compute-cost overhead, and leverages the Fast Mann-Kendall Computation Algorithm (see U.S. Pat. No. 7,542,995, issued Jun. 2, 2009, entitled "Method and Apparatus for Efficient Change-Point Detection in Telemetric Time Series," by inventors S. Thampy and Kenny C. Gross.)

Even if a malicious user becomes aware of the novel combination of pattern recognition and statistical-process-control techniques embodied in the above-described intrusion-detection techniques, there is no way the malicious user can leverage that knowledge to his/her benefit. The reason is that while it may be possible for a remote hacker to cleverly insert tiny delays into TCP/IP packet streams to increase IAT distributions, it is impossible for a hacker to shorten IAT distributions.

Extensions

Networks that allow authenticated users to log in from any location (e.g., banking networks, stock funds, medical accounts, social media networks, company work accounts for employees who work from home and/or travel and need to access their work accounts, etc.) will typically challenge a user whenever logging in from a new IP address, and ask the user to enter a code that is sent in real-time to the user's cell phone. If a malicious imposter spoofs an already known IP address for an authenticated user, and also logs in using stolen login credentials for that authenticated user (e.g., from phishing), then the malicious user will not get challenged for the code sent to the legitimate user's cell phone. However, a variation on the IAT fingerprint technique reported here would be to store IAT fingerprints for authenticated users including the IAT fingerprints for every IP address that the authenticated user logs in from. This capability can further fortify the security margins even for non-critical use cases where remote logins are allowable.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing an intrusion-detection technique to differentiate between packets received from malicious remote users and legitimate local users in a networked computer system, comprising:
   determining arrival times for incoming packets at a node in the networked computer system;
   determining inter-arrival times between the incoming packets from the arrival times;
   determining a mean cumulative function (MCF) for the inter-arrival times by computing a cumulative sum of the inter-arrival times;
   monitoring a piecewise continuous digitized inter-arrival time MCF fingerprinting for all authenticated users;
   in response to detecting a change in a slope of the MCF, generating an alarm to indicate that a malicious remote user is generating some of the incoming packets; and
   wherein generating the alarm additionally comprises terminating the traffic of the malicious remote user.

2. The method of claim 1, wherein detecting the change in the slope includes using Sen's nonparametric slope estimation technique to compute the slope of the MCF.

3. The method of claim 1, wherein detecting the change in the slope includes using a Mann-Kendall test to detect a change point in the slope of the MCF.

4. The method of claim 1, wherein detecting the change in the slope includes using a fast Mann-Kendall computation to detect a change point in the slope of the MCF, wherein the fast Mann-Kendall computation inserts data points into a balanced search tree to improve performance of the Mann-Kendall computation.

5. The method of claim 1, wherein prior to determining the inter-arrival times, the method further comprises filtering the incoming packets based upon at least one filtering criterion to generate a set of filtered incoming packets to be used in determining the inter-arrival times.

6. The method of claim 1, wherein the method further comprises estimating a number of network hops traversed by packets originating from the malicious remote user based on a magnitude of the change in slope.

7. The method of claim 1, wherein determining the arrival times for the incoming packets includes obtaining the arrival times for the incoming packets from timestamps generated by a packet-capturing tool located at the node in the networked computer system.

8. The method of claim 1, wherein generating the alarm includes sending the alarm to a system administrator to enable the system administrator to verify whether a malicious remote user has compromised the network computer system by using a spoofed credential.

9. A non-transitory computer-readable storage medium storing instructions that when executed by a computer cause the computer to perform a method for performing an intrusion-detection technique to differentiate between packets received from malicious remote users and legitimate local users in a networked computer system, the method comprising:
   determining arrival times for incoming packets at a node in the networked computer system;
   determining inter-arrival times between the incoming packets from the arrival times;

determining a mean cumulative function (MCF) for the inter-arrival times by computing a cumulative sum of the inter-arrival times;

monitoring a piecewise continuous digitized inter-arrival time MCF fingerprinting for all authenticated users;

in response to detecting a change in a slope of the MCF, generating an alarm to indicate that a malicious remote user is generating some of the incoming packets; and wherein generating the alarm additionally comprises terminating the traffic of the malicious remote user.

10. The non-transitory computer-readable storage medium of claim 9, wherein detecting the change in the slope includes using Sen's nonparametric slope estimation technique to compute the slope of the MCF.

11. The non-transitory computer-readable storage medium of claim 9, wherein detecting the change in the slope includes using a Mann-Kendall test to detect a change point in the slope of the MCF.

12. The non-transitory computer-readable storage medium of claim 9, wherein detecting the change in the slope includes using a fast Mann-Kendall computation to detect a change point in the slope of the MCF, wherein the fast Mann-Kendall computation inserts data points into a balanced search tree to improve performance of the Mann-Kendall computation.

13. The non-transitory computer-readable storage medium of claim 9, wherein prior to determining the inter-arrival times, the method further comprises filtering the incoming packets based upon at least one filtering criterion to generate a set of filtered incoming packets to be used in determining the inter-arrival times.

14. The non-transitory computer-readable storage medium of claim 9, wherein the method further comprises estimating a number of network hops traversed by packets originating from the malicious remote user based on a magnitude of the change in slope.

15. The non-transitory computer-readable storage medium of claim 9, wherein determining the arrival times for the incoming packets includes obtaining the arrival times for the incoming packets from timestamps generated by a packet-capturing tool located at the node in the networked computer system.

16. The non-transitory computer-readable storage medium of claim 9, wherein generating the alarm includes sending the alarm to a system administrator to enable the system administrator to verify whether a malicious remote user has compromised the network computer system by using a spoofed credential.

17. A system that performs an intrusion-detection technique to differentiate between packets received from malicious remote users and legitimate local users in a networked computer system, comprising:

an intrusion-detection mechanism that operates in the networked computer system;

wherein during operation, the intrusion-detection mechanism, determines arrival times for incoming packets at a node in the networked computer system;

determines inter-arrival times between the incoming packets from the arrival times;

determines a mean cumulative function (MCF) for the inter-arrival times by computing a cumulative sum of the inter-arrival times;

monitor a piecewise continuous digitized inter-arrival time MCF fingerprinting for all authenticated users;

in response to detecting a change in a slope of the MCF, generates an alarm to indicate that a malicious remote user is generating some of the incoming packets; and wherein generating the alarm additionally comprises terminating the traffic of the malicious remote user.

18. The system of claim 17, wherein while detecting the change in the slope, the intrusion-detection mechanism uses Sen's nonparametric slope estimation technique to compute the slope of the MCF.

19. The system of claim 17, wherein while detecting the change in the slope, the intrusion-detection mechanism uses a Mann-Kendall test to detect a change point in the slope of the MCF.

20. The system of claim 17, wherein prior to determining the inter-arrival times, the instruction-detection mechanism filters the incoming packets based upon at least one filtering criterion to generate a set of filtered incoming packets to be used in determining the inter-arrival times.

* * * * *

UNITED STATES PATENT AND TRADEMARK OFFICE
CERTIFICATE OF CORRECTION

PATENT NO. : 10,015,139 B2
APPLICATION NO. : 15/015055
DATED : July 3, 2018
INVENTOR(S) : Gross et al.

Page 1 of 1

It is certified that error appears in the above-identified patent and that said Letters Patent is hereby corrected as shown below:

In the Drawings

On sheet 2 of 3, in FIG. 2, under Reference Numeral 212, Line 1, delete "GENERATE AN ALARM GENERATE AN ALARM" and insert -- GENERATE AN ALARM --, therefor.

On sheet 3 of 3, in FIG. 3, Line 1, delete "Cummulative" and insert -- Cumulative --, therefor.

In the Specification

In Column 7, Line 64, delete "Q[(N'+2/2]}," and insert -- Q[(N'+2)/2]}, --, therefor.

In Column 8, Line 31, delete "Non parametric" and insert -- Non-parametric --, therefor.

Signed and Sealed this
Second Day of April, 2019

Andrei Iancu
*Director of the United States Patent and Trademark Office*